United States Patent [19]

Gilbert et al.

[11] Patent Number: 5,502,760
[45] Date of Patent: Mar. 26, 1996

[54] TELEPHONE-LINE DEDICATING APPARATUS

[75] Inventors: Wayne Gilbert, Honolulu, Hi.;
Nobuaki Yokoyama, Tokyo, Japan

[73] Assignee: General Research of Electronics, Inc., Tokyo, Japan

[21] Appl. No.: 337,121

[22] Filed: Nov. 10, 1994

[30] Foreign Application Priority Data

Nov. 10, 1993 [JP] Japan .................................. 5-304728

[51] Int. Cl.$^6$ .............................................. H04M 11/00
[52] U.S. Cl. .......................... 379/90; 379/184; 379/194
[58] Field of Search .......................... 379/90, 93, 96–99,
379/184, 186–190, 193–196, 198, 199, 442

[56] References Cited

U.S. PATENT DOCUMENTS

| | | | |
|---|---|---|---|
| 4,747,128 | 5/1988 | Chan et al. | 379/194 |
| 4,807,278 | 2/1989 | Ross | 379/184 |
| 4,825,465 | 4/1989 | Ryan | 379/184 |
| 5,048,073 | 9/1991 | Weiser et al. | 379/90 |

*Primary Examiner*—Wing F. Chan
*Attorney, Agent, or Firm*—Trexler, Bushnell, Giangiorgi & Blackstone, Ltd.

[57] ABSTRACT

A telephone-line dedicating apparatus which is connected between an external telephone-line and a specified telephone-line utilization apparatus such as a telephone-set, facsimile machine or the like and which upon energization causes one or more other telephone-line utilization apparatus to be unable to function connected to said external telephone-line is disclosed. Specially, when said specified telephone-line utilization apparatus is a facsimile machine, any influence on said facsimile machine which is in use, due to noises from the other equipments connected to the same external telephone-line can be prevented. The telephone-line dedicating apparatus comprises: impedance insertion means for inserting impedance means across said external telephone-line to decrease the telephone-line DC voltage level, in response to the operative condition of said specified telephone-line utilization apparatus; and operating-current path setting means including a DC power supply and establishing an operating-current path from said DC power supply to said specified telephone-line utilization apparatus through said impedance means when said impedance means has been inserted across said external telephonel-ine.

5 Claims, 1 Drawing Sheet

TELEPHONE-LINE DEDICATING APPARATUS

FIELD OF THE INVENTION

This invention relates to a telephone-line dedicating apparatus which is adapted to be connected between the telephone line and a telephone set, a facsimile machine or the like and which upon energization causes all other telephone sets or telephone-line utilization apparatuses connected to the same telephone-line to be unable to function.

BACKGROUND OF THE INVENTION

In case where more than one telephone set, facsimile machine or other telephone-line utilization apparatus is connected to the same telephone-line, it is desired that, when a specified one of these telephone-line utilization apparatus is operated, for example a telephone set of these telephone-line utilization apparatus is "on-hooked" (its telephone receiver is taken off for a phone call), all of the other telephone-line utilization apparatuses are caused to be in a "dead" condition to be unable to be used. This is important in that the privacy of the specified telephone set is kept from the other telephone sets connected to the same telephone-line. Further, if the specified telephone-line utilization apparatus is a facsimile machine, this is protected against a noise which is inadvertently generated by the other equipments connected to the same telephone-line.

SUMMARY OF THE INVENTION

One important object of this invention is to attain such demands by a very simple circuit.

For this object, this invention provides a telephone-line dedicating apparatus which is adapted to be connected between an external telephone-line and a specified telephone-line utilization apparatus, such as s telephone set, facsimile machine or the like and which upon energization causes all other telephone-line utilization apparatuses connected to said telephone line to be unable to function, said telephone-line dedicating apparatus comprising: impedance insertion means for inserting impedance means across said external telephone-line to decrease the telephone-line DC voltage level, in response to the operative condition of said specified telephone-line utilization apparatus; and operating-current path setting means including a DC power supply and establishing an operating-current path from said DC power supply to said specified telephone-line utilization apparatus through said impedance means when said impedance means has been inserted across said external telephone-line. In a preferred embodiment, this impedance means comprises an inductor which has a sufficiently low DC resistance value to reduce the DC voltage level on said external telephone-line to be unable to operate said other telephone-line utilization apparatus connected to said external telephone-line and has a sufficiently high impedance value to enable the usual operation of said specified telephone-line utilization apparatus with respect to speech/frequency response. Said impedance insertion means includes relay means which is adapted to be energized when said specified telephone-line utilization apparatus is conditioned to be operated, and following the energization of said relay means said impedance means is inserted across said external telephone-line. In detail, said impedance insertion means includes switch means for causing, when operated, said relay means to be energized after said specified telephone-line utilization apparatus is conditioned to be operated, and said operating-current setting means causes a series circuit to be established, which comprises said DC power supply, said impedance means which has been inserted across said external telephone-line by the energization of said relay means and said specified telephone-line utilization which has been conditioned to be operated. Specifically, said switch means is a push switch for temporary on-operation, and further comprising means for self-holding the energization of said relay in response to the establishment of said series circuit.

DESCRIPTION OF THE PREFERRED EMBODIMENT

Figure 1:
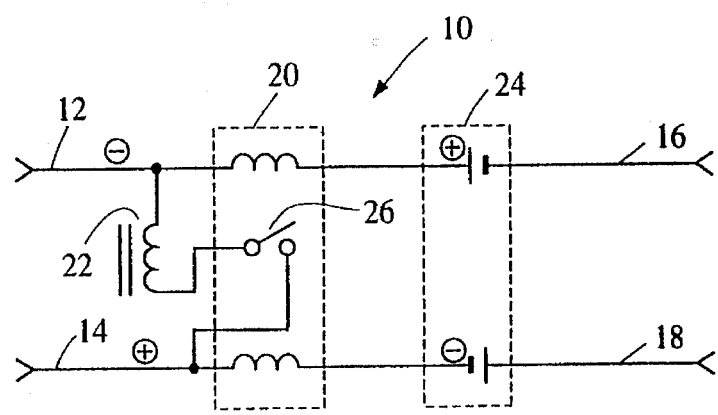
FIG. 1 is a circuit diagram for explaining of the principle of the telephone-line dedicating apparatus according to the invention.

FIG. 1 is an explanatory view for explaining the principle of this invention. A telephone-line dedicating apparatus 10 according to this invention is adapted to be connected between an external telephone-line comprising two telephone-line cables 12 and 14 and an output telephone-line comprising two telephone-line cables 16 and 18 to which a specified telephone set, a facsimile machine or the like of which privacy must be retained is connected. To the external telephone-line (12, 14) which constitutes the output of the telephone line dedicating apparatus, more than one telephone set or other telephone-line utilization apparatus may be connected. When the telephone-line dedicating apparatus 10 is energized in a manner as will be explained later in detail, all of the other telephone sets and telephone-line utilization apparatuses connected to the external telephone-line (12, 14) are caused to be unable to function so that the privacy of the specified telephone-line utilization apparatus connected to the output telephone-line (16, 18) is protected against the others. Therefore, when the specified telephone line utilization apparatus of which privacy should be protected is a usual telephone set, the contents of conversation which are sent and received through this telephone set cannot be intercepted by the other telephone sets connected to the external telephone-line (12, 14), and when the specific telephone-line utilization apparatus is a facsimile machine, any malfunction of the facsimile machine caused by the noises from the other telephone sets connected to the same external telephone-line (12, 14) is prevented.

As is shown in FIG. 1, the telephone-line dedicating apparatus 10 according to this invention comprises a sense relay 20, an inductor 22 and a battery 24. When the specified telephone set or facsimile machine connected to the telephone-line dedicating apparatus 10 through the output telephone-line (16, 18) becomes an operative condition, for example when the specified telephone set is off-hooked for a telephone call, or the specified facsimile machine starts transmission or reception, the sensing relay 20 operates to close a relay contact 26. This causes the inductor 22 to be connected between the external telephone-line cables 12 and 14. The inductor 22 has a sufficiently low DC resistance value to reduce the DC voltage on the telephone-line to be unable to operate the other equipments connected to the external telephone-line (12, 14). The inductance value of the inductor 22 has a sufficiently high impedance value to enable the usual operation of the telephone-line utilization apparatus with respect to speech/frequency response. The telephone-line utilization apparatus 10 connected to the output telephone-line is powered by the battery 24 because it no longer has been powered by the external telephone-line. In this manner, the telephone line dedicating apparatus 10 according to this invention in effect isolates the specified equipment connected to its output line (16, 18) from all of other equipments connected to the external telephone-line (12, 14).

In FIG. 1 showing the principle of this invention, the telephone-line dedicating apparatus 10 is operative only in case where the polarities of the external telephone-line are positive (+) at the cable 12 and negative (−) at the cable 14. This is because the polarities of the battery 24 are positive (+) at the output cable 16 and negative (−) at the output cable 18. In such polarity conditions, when the specified telephone-line utilization apparatus connected to the output telephone-line is off-hooked (or started for facsimile transmission or reception), current flows through the coils of the sensing relay 20 to close the relay contact 26 and then to insert the inductor 22 between the cables 12 and 14 of the external telephone-line. The insertion of this inductor cause the DC voltage level on the external telephone line to reduce. Therefore, with this reduced DC voltage level, the telephone-line utilization apparatuses connected directly to the external telephone lines cannot be operated. However, the specified telephone-line utilization apparatus connected to the output of the telephone-line dedicating apparatus 10 which is in the off-hooked condition is powered by the battery 24 through the inserted inductor 22 as will become clear from the explanation regarding FIG. 2 and therefore only the specified equipment can function with the other equipments connected the same common external telephone-line being kept in a dead condition.

Figure 2:
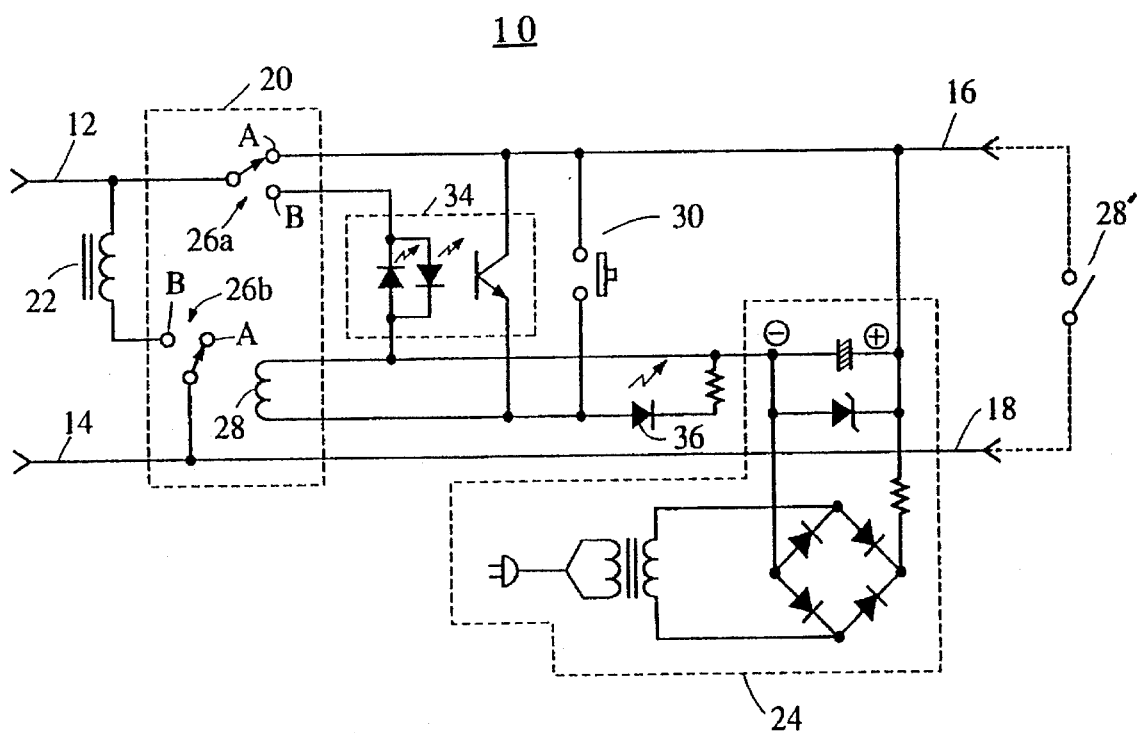
FIG. 2 is a circuit diagram for a practical embodiment arranged in accordance with the principle of this invention shown in FIG. 1.

FIG. 2 shows a practical circuit for the telephone-line dedicating apparatus of which principle is shown in FIG. 1. In this Figure, the sense relay 20 has two relay switches 26A and 26B which are shown at the normal position A, respectively which corresponds to the open condition of the relay contact 26 in FIG. 1. Also, what is shown by a switch 28' connected to the output telephone-line (16, 18), that is the output of the telephone-line dedicating apparatus 10 by a dotted line, identifies the specified telephone-line utilization apparatus. The closing of this switch 28' means the off-hook of the telephone set or the transmission or reception of the facsimile machine. In order to set up the dedicating operation mode of the telephone-line dedicating apparatus, after the specified telephone-set was off-hooked or the specified facsimile machine started its transmitting/receiving operation, it is needed to push on a return-type switch 30. This establishes a current path from the positive (+) terminal of the DC power supply 24 through this switch 30 and a relay coil 28 to the negative (−) terminal of the power supply 24 to energize the relay 20. The energization of the relay 20 changes the contact conditions of the relay switches 26A and 26B from A to B. By this change of the relay switch contact conditions to B, the inductor 22 is inserted in parallel with the external telephone-line (12, 14) through the relay switch 26B to decrease the telephone-line DC voltage level. As a result, the equipments connected directly to the external telephone-line become the dead condition. Also, the change of the contact condition of the relay switch 26A from A to B due to the energization of the relay 20 establishes a current path from the positive terminal of the power supply 24 through the output telephone-line cable 16, the specified telephone-line utilization apparatus (which is identified by the switch 28' which has been turned on by the off-hook), the other output telephone-line cable 18, the relay switch 26B, the inductor 22 and the LED portion of a photo coupler 34 to the negative terminal of the power supply 24. Therefore, the DC power supply 24 is effectively connected to the specified telephone-line utilization apparatus (28') through the inductor 22 in the same manner as in FIG. 1.

The photo coupler 34 acts to cause the relay 20 to make a self-hold function. That is to say, once a current flows to its LED portion, the resultant light emission of the LED turns on the collector-emitter path of the transistor portion of the photo coupler 34 to set a path parallel to the push switch 30. Therefore, even though the switch 30 has changed off, the energization of the relay 20 continues because a substitute current path for the energization of the relay coil 28 is established from the positive terminal of the power supply 24 through the collector-emitter path of the photo coupler 34 and the relay coil 38 to the negative terminal of the power supply 24.

When the specified telephone-line utilization apparatus stops operating (for example, by the on-hook of the telephone set), of which result is expressed by the turn-off of the switch 28', the above-mentioned current path through the inductor 22 inserted across the external telephone-line (12, 14) is cut off. Therefore, the current flow through the LED portion of the photo coupler 34 becomes extinct and its light emission is stopped. This turns off the transistor portion of the photo coupler 34. Therefore, the current passing through the relay coil 28 is stopped, too and the relay 20 is released from the energization. As a result, the relay switches 26A and 26B changes the contact positions to A.

A light emitting diode 36 connected together with a resistor in parallel to the relay coil 28 indicates, when lighting, the above-mentioned dedicating operation mode of the embodiment shown in FIG. 2, during which the relay is energized.

Having thus described this embodiment of the invention, a number of modifications will be readily apparent to those skilled in the art. The invention is defined by the following claims.

What is claimed is:

1. A telephone-line dedicating apparatus which is connected between an external telephone-line and a specified telephone-line utilization apparatus such as a telephone-set, facsimile machine or the like and which upon energization causes one or more other telephone-line utilization apparatus to be unable to function connected to said external telephonel-ine, comprising:

impedance insertion means for inserting impedance means across said external telephone-line to decrease the telephone-line DC voltage level, in response to the operative condition of said specified telephone-line utilization apparatus; and operating-current path setting means including a DC power supply and establishing an operating-current path from said DC power supply to said specified telephone-line utilization apparatus through said impedance means when said impedance means has been inserted across said external telephone-line.

2. The telephone-line dedicating apparatus as claimed in claim 1 wherein said impedance means comprises an inductor which has a sufficiently low DC resistance value to reduce the DC voltage level on said external telephone-line to be unable to operate said other telephone-line utilization apparatus connected to said external telephone-line and has a sufficiently high impedance value to enable the usual operation of said specified telephone-line utilization apparatus with respect to speech/frequency response.

3. The telephone-line dedicating apparatus as claimed in claim 1 wherein said impedance insertion means includes relay means which is adapted to be energized when said specified telephone-line utilization apparatus is conditioned to be operated, and following the energization of said relay means said impedance means is inserted across said external telephone-line.

4. The telephone-line dedication apparatus as claimed in claim 3 wherein said impedance insertion means includes switch means for causing, when operated, said relay means to be energized after said specified telephone-line utilization apparatus is conditioned to be operated, and said operating-current setting means causes a series circuit to be established, which comprises said DC power supply, said impedance means which has been inserted across said external telephone-line by the energization of said relay means and said specified telephone-line utilization which has been conditioned to be operated.

5. The telephone-line dedication apparatus as claimed in claim 4 wherein said switch means is a push switch for temporary on-operation, and further comprising means for self-holding the energization of said relay in response to the establishment of said series circuit.

* * * * *